No. 659,643. Patented Oct. 16, 1900.
V. BONZAGNI.
APPARATUS FOR CLEANSING WATER PIPES.
(Application filed July 11, 1900.)
(No Model.) 2 Sheets—Sheet 1.
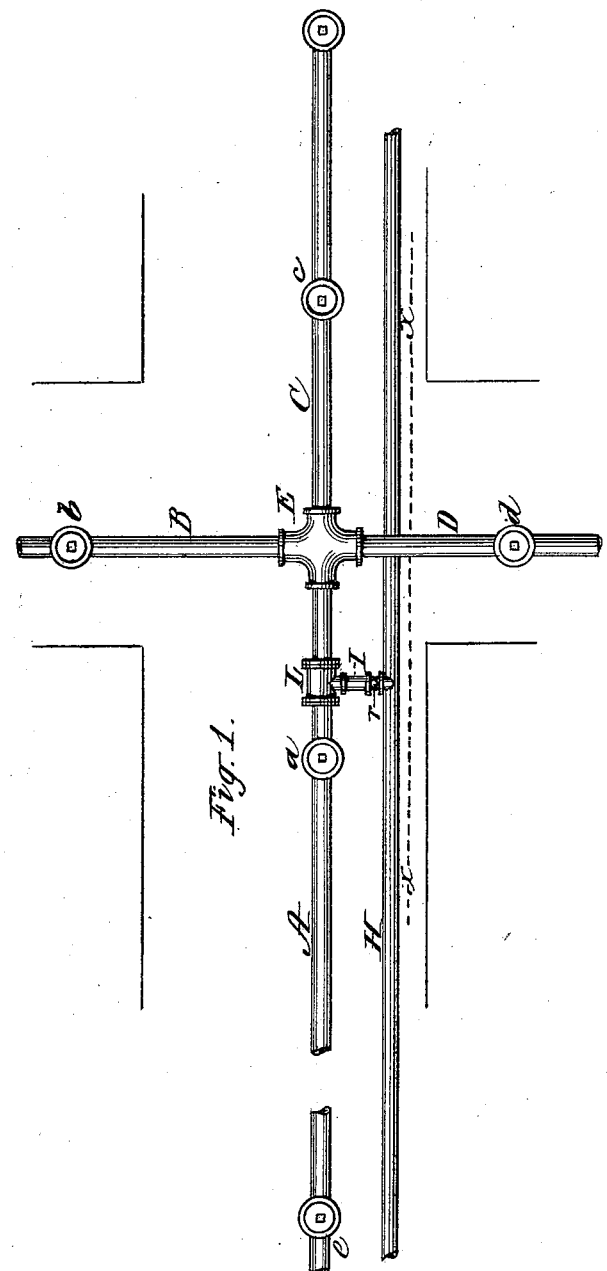
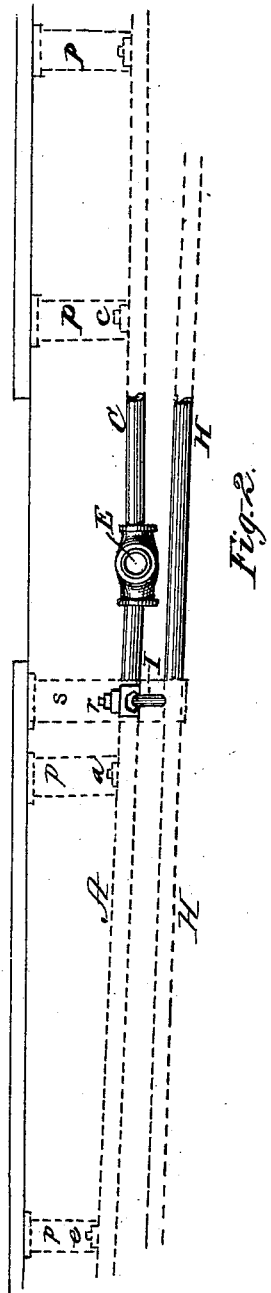
Witnesses
A. F. Stearns
Luigi Costa
Inventor,
Vincenzo Bonzagni,
pr Norman W. Stearns,
Attorney.
THE NORRIS PETERS CO., PHOTO-LITHO., WASHINGTON, D. C.

No. 659,643. Patented Oct. 16, 1900.
V. BONZAGNI.
APPARATUS FOR CLEANSING WATER PIPES.
(Application filed July 11, 1900.)
(No Model.) 2 Sheets—Sheet 2.
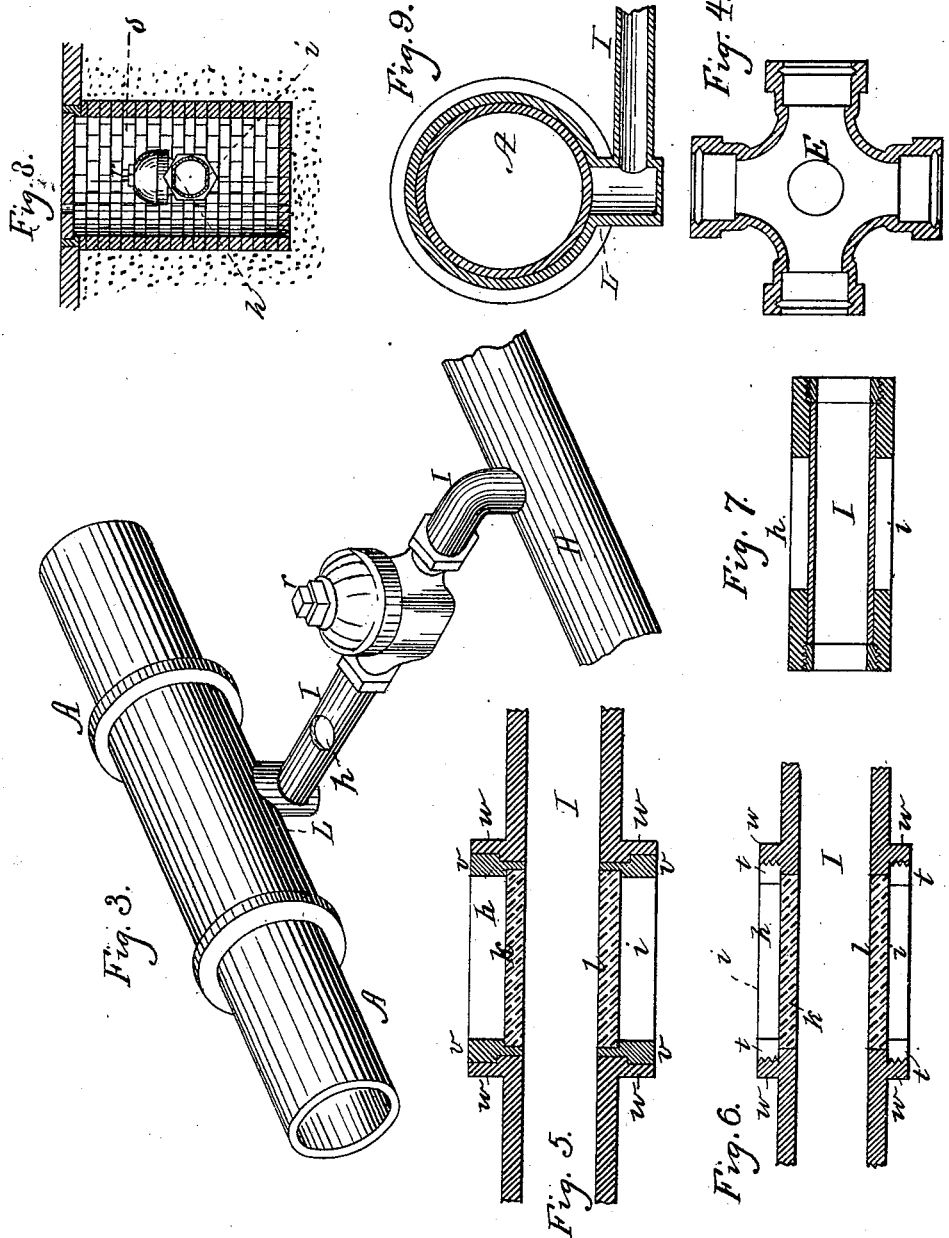
WITNESSES
R. F. Storm
E. E. Masson
INVENTOR
Vincenzo Bonzagni
pr Norman W. Stearns,
Attorney

UNITED STATES PATENT OFFICE.

VINCENZO BONZAGNI, OF BOSTON, MASSACHUSETTS.

APPARATUS FOR CLEANSING WATER-PIPES.

SPECIFICATION forming part of Letters Patent No. 659,643, dated October 16, 1900.

Application filed July 11, 1900. Serial No. 23,269. (No model.)

*To all whom it may concern:*

Be it known that I, VINCENZO BONZAGNI, of East Boston, Suffolk county, State of Massachusetts, have invented certain Apparatus for Cleansing the Interior of Water-Pipes, of which the following is a full, clear, and exact description, reference being had to the accompanying drawings, making part of this specification, in which—

Figure 1 represents the four corners of two streets crossing at right angles with water-mains located thereunder and a sewer or drain pipe with my invention applied thereto; Fig. 2, a vertical section on line $x\ x$ of Fig. 1; Fig. 3, a perspective view showing my flushing-pipe leading from a section of a water-distributing pipe into a sewer-section. Fig. 4 is a four-way coupling for intersecting lines of water-pipes. Figs. 5, 6, and 7 represent glass windows in my flushing-pipe and different means of securing them therein. Fig. 8 is a cross-section through one of my flushing-pipes and the manhole by which it is accessible. Fig. 9 is a transverse section showing the connection of my flushing-pipe with a water-pipe.

In the distribution of water for cities, towns, &c., through main, branch, and service pipes either for drinking or industrial purposes it is of vital importance that impurities and sediment be eliminated from the supply. Settling-tanks, coagulating-basins, and filtering apparatus of various constructions have been located at the source of supply which cause the deposit of much of the foreign matter and prevent its entrance into the distributing-inlet; but careful experience has proven that the best systems of elimination are only approximately successful, the result being that germs, microbes, or protoplasms of vegetable and animal life invisible to the eye pass through the filter into the distributing-pipes, where, developing in size and form, some of them perish and decay, and the accumulation of this refuse taints the water and is pernicious to the health of the public who drink it and is also injurious wherever employed in the arts—for instance, in paper and starch making, &c.—and incrusting and corroding the water-tubes of boilers, &c. Moreover, the filtration of the water at the outlet or place of consumption or use—as, for instance, at the supply-faucet in houses for drinking and cooking purposes—does not remove the bad odor, taste, and unnatural color imparted to the water during its contact with the impurities within the pipes.

My present invention relates particularly to the removal of all such obnoxious sediment from the interior of the water-distributing pipes; and this invention consists in a flushing-pipe having an unobstructed straight passage of adequate capacity, in combination with a gate for opening and closing the same and leading directly from the bottom of a water-distributing pipe (preferably a water-main) into the top of a drain-pipe or sewer, (preferably the nearest thereto,) communication between the line of water-distributing pipes first to be cleansed and the sewer being opened and the lines of all other water-distributing pipes (usually connected with the one being cleansed) being temporarily closed by shutting their gates, each line of pipes to be cleansed being opened at two points at least, one at its gate nearest the flushing-pipe and the other at a gate located, preferably, at a higher elevation, unless the line of water-pipes be on a level, in which case a gate may be opened at any convenient distance from the flushing-pipe to be first employed, by which arrangement the interior of the several water-distributing pipes may be successively and thoroughly flushed by the great pressure of the water due to the elevation of the source of supply above the distributing-lines and the entire accumulation of the unhealthy sediment lodged in the water-pipes of that line be forced in a solid stream through the direct passage of the straight flushing-pipe (when open) into the sewer.

In the said drawings, A B C D represent lines of main water-distributing pipes meeting at and united by an ordinary four-way coupling E, Figs. 1 and 4, at the junction of two streets crossing each other at right angles, the pipes being located underground and to one side of the centers of the streets and provided with gates $a\ b\ c\ d$, as usual.

$p\ p$ are manholes by which the gates are readily accessible.

$e$ is another controlling-gate located at some point on the line A higher than the gate $a$.

H is one line of sewer or drain pipe running parallel with the line A of water-distributing pipes and located between it and the contiguous side of the street and at a lower level than said line A.

I is a straight pipe, Fig. 3, leading directly from the bottom, Fig. 9, of one of the water-distributing pipes A to and into the top of a sewer or drain pipe H nearest thereto, the passage in said pipe I being of sufficient diameter relative with that of the main, branch, and service water-pipes to insure a high degree of velocity of the water in the distributing-pipes and being controlled by a gate $r$, accessible by a manhole $s$, Fig. 8. This pipe may be united to its water-distributing pipe by a coupling L, located between the gate $a$ and the four-way coupling E, Figs. 1 and 2.

I designate the pipe I a "flushing-pipe," as it serves the function of receiving and discharging the sediment of the water-distributing pipe into the sewer. (See Fig. 9.)

$h$ is a circular opening in the top of the flushing-pipe, and $i$ is a similar opening through its bottom in a vertical line thereunder. Within these openings are securely located strong glass disks $k$ $l$, whose inner surfaces are level with the contiguous inner surfaces of the flushing-pipe, the edges of these disks being laid in lead or waterproof cement in a well-known manner to prevent leakage. Said disks serve as windows by which the condition of the interior of the flushing-pipe is viewed, and the pipes of the water distribution are flushed and rinsed until all of the sediment passing through the flushing-pipes is carried away into the sewer. Different ways of locating these windows at the openings $h$ $i$ may be adopted—for instance, glass disks may be inserted within frames $v$, which may be placed within circular flanges $w$, projecting from the outside of the pipe I and surrounding the openings $h$ $i$ therein, as seen in Fig. 5, or the disks may be firmly secured by rings $t$, turned within screw-threads formed in the flanges $w$ $w$, (see Fig. 6,) or a glass tube may be inserted within the flushing-pipe at the openings $h$ $i$, Fig. 7.

The bottom of the manhole $s$, Fig. 8, is carried down a short distance below and underneath the window of the lower opening $i$ in order to afford a convenient means of placing a strong light at this point while examining the condition of the inside of the flushing-pipe.

Although I prefer to employ the glass windows, the flushing-pipe may be used without them.

I claim—

1. In a system of water distribution for drinking and other domestic and manufacturing purposes, the combination of the following elements: a series of water-distributing pipes comprised in said system, a series of gates for independently opening and closing the different lines of the same; a series of drain or sewer pipes, a series of straight flushing-pipes of sufficient diameter relative to that of the main, branch or service water-pipes, to insure a high degree of velocity of the water in the distributing-pipes, and leading directly from the bottoms of the water-pipes into the tops of the drain or sewer pipes and gates located in the flushing-pipes for opening and closing communication between the water-pipes and sewers; whereby the sediment accumulated in the water-pipes may be directly discharged (without obstruction) into their contiguous sewers or drain-pipes, in unbroken streams and with the maximum degree of pressure due to the fall of the water; all constructed to be operated substantially as described.

2. In a system of water distribution for cities and towns, &c., a flushing-pipe I in combination with and interposed between the bottom of a water-distributing pipe A and the top of a sewer or drain pipe H, a means of opening and closing communication between them; an opening in the top of the flushing-pipe, an opening in its bottom directly thereunder, glass windows set within said openings; and, a manhole located thereat and extended down below the bottom thereof, to admit of the application of a light for viewing the interior of the flushing-pipe, as set forth.

In testimony whereof I have signed my name hereunto before two subscribing witnesses.

VINCENZO BONZAGNI.

Witnesses:
 N. W. STEARNS,
 WM. N. SWAIN.